United States Patent [19]
Wetzel et al.

[11] Patent Number: 5,986,368
[45] Date of Patent: Nov. 16, 1999

[54] ELECTROHYDRAULIC UNIT AND METHOD FOR ASSEMBLING AN ELECTROHYDRAULIC UNIT

[75] Inventors: Gerhard Wetzel, Korntal-Muenchingen; Martin Maier, Moeglingen, both of Germany

[73] Assignee: Robert Bosch GmbH, Stuttgart, Germany

[21] Appl. No.: 08/911,356

[22] Filed: Aug. 7, 1997

[30] Foreign Application Priority Data

Sep. 13, 1996 [DE] Germany .......................... 196 37 251

[51] Int. Cl.⁶ .................................................. H02K 11/00
[52] U.S. Cl. ............................ 310/71; 310/42; 417/423.7
[58] Field of Search .................... 310/71, 42; 417/423.7, 417/423.14, 424.1, 424.2; 29/596; 439/81

[56] References Cited

U.S. PATENT DOCUMENTS

| | | | |
|---|---|---|---|
| 3,604,964 | 9/1971 | Conrad | 310/71 |
| 5,124,602 | 6/1992 | Nishimura et al. | 310/68 B |
| 5,158,468 | 10/1992 | Curtis et al. | 439/76 |
| 5,287,032 | 2/1994 | Zolda | 310/219 |
| 5,326,235 | 7/1994 | Bruhn | 310/89 |
| 5,605,448 | 2/1997 | Martin | 417/360 |
| 5,811,902 | 9/1998 | Sato | 310/71 |

*Primary Examiner*—Nestor Ramirez
*Assistant Examiner*—Burt Mullins
*Attorney, Agent, or Firm*—Edwin E. Greigg; Ronald E. Greigg

[57] ABSTRACT

An electrohydraulic unit for controlling pressure in slip-controlled motor vehicle brake systems comprises a hydraulic block, with an electric motor mounted on a first side, and a control unit secured to an opposite second side of the hydraulic block. Electrical terminals of the electric motor are passed through the hydraulic block and are embodied inside the control unit as resilient contact means. The contact means engage contact faces of the control unit with an initial stress. The resilient contact means make electrical plugs in the control unit unnecessary, and they compensate for tolerances in and transverse to the mounting direction of the electric motor and control unit.

5 Claims, 1 Drawing Sheet

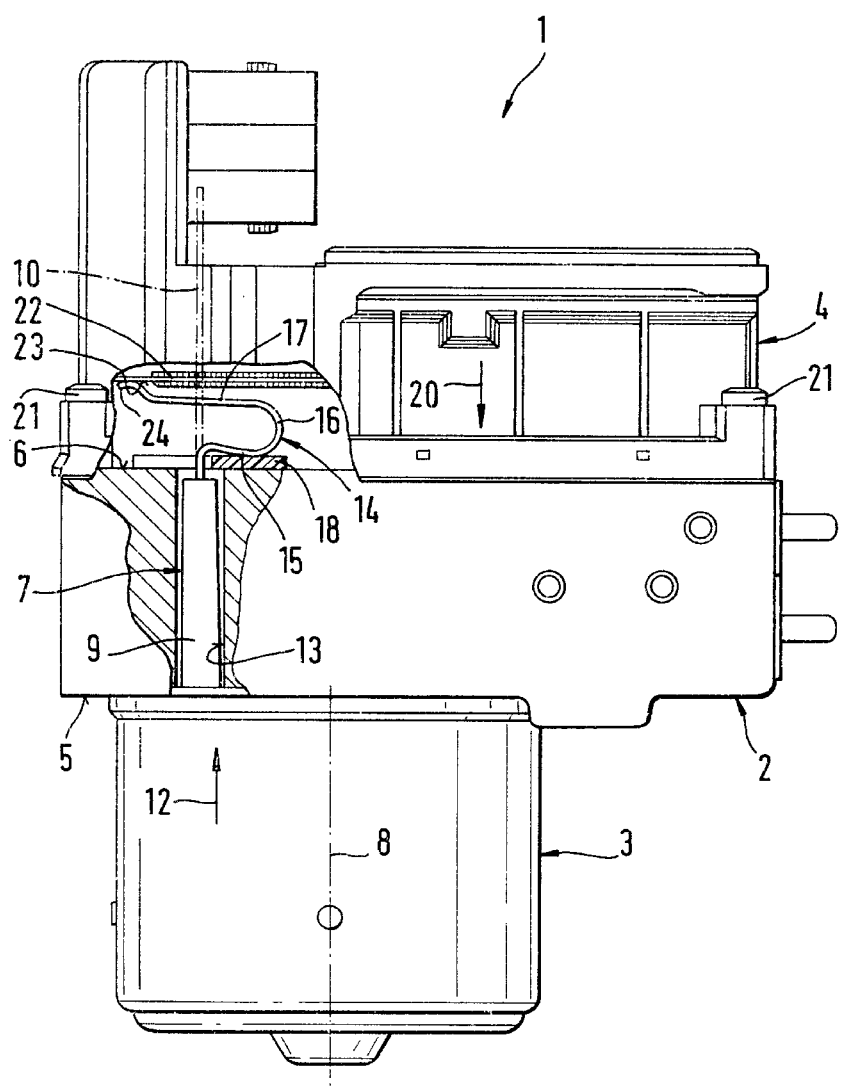

ELECTROHYDRAULIC UNIT AND METHOD FOR ASSEMBLING AN ELECTROHYDRAULIC UNIT

BACKGROUND OF THE INVENTION

The invention is based on an electrohydraulic unit and also relates to a method for assembling an electrohydraulic unit.

An electrohydraulic unit of this kind is already known (German Patent Disclosure DE 43 20 005 A1), in which a bearing plate that closes off the electric motor on its face end has a plastic extension, extending parallel to the motor axis, in which an electric connection element of the motor, in the form of a rigid contact lug, is received. The electric motor is flanged to a hydraulic block, and the extension of the bearing plate passes through a through bore of the hydraulic block. On the end of the hydraulic block opposite the electric motor, a control unit is provided into which the extension protrudes to engage it. The control unit has a plug in which contact springs are disposed. When the unit is assembled, the contact lug, protruding freely on the end, engages the space between the contact springs, while the end of the extension is received fittingly by the plug. The extension then forms a tight, lockable unit with the plug. This known embodiment is disadvantageous in the sense that a lateral offset between the plug and extension, for instance, can make it harder to join the two parts together. This occurs especially in manual assembly, where because the plug is located in the middle of the control unit, it is difficult to monitor the assembly process visually.

OBJECT AND SUMMARY OF THE INVENTION

The electrohydraulic unit according to the invention and the method of the invention are advantageous in the sense that because of the resilient design of the contact means in the assembly direction of the control unit, tolerances between the electrical terminals, associated with one another, of the electric motor and control unit, as well as deviations originating in the hydraulic block, can be compensated for in a simple way both in the assembly direction and transversely to it. In the latter case, a sufficiently large contact face on the control unit for the contact means of the electric motor is a prerequisite. Disconnecting the electrical connection between the electric motor and the control unit can be done easily, without wear. No plug is needed in the control unit. Since the control unit has to be sealed off from the hydraulic block anyway, protection of the contacting according to the invention is achieved without additional provisions. The forms the contact means of the electric motor can take after the electric motor is mounted on the hydraulic block can be achieved economically in an automated assembly line.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing shows an electrohydraulic unit comprising a control unit, hydraulic block and electric motor.

DESCRIPTION OF THE PREFERRED EMBODIMENT

An electrohydraulic unit 1 shown in the drawing for controlling pressure in slip-controlled motor vehicle brake systems comprises component groups in the form of a hydraulic block 2, an electric motor 3, and a control unit 4. The hydraulic block 2 essentially includes pump elements and magnet valves, which are not visible in the drawing. The hydraulic block 2 has two side faces 5 and 6, extending parallel to one another, on one of which (5) the electric motor 3 and on the other of which (6) the control unit is disposed. The electric motor 3 has two electrical terminals 7, only one of which is visible in the drawing. The terminals 7 extend parallel to the longitudinal axis 8 of the electric motor 3 and are provided with a plastic coating 9 beginning at the motor. Downstream of the plastic coating 9, the terminals 7 are embodied in the form of wire with a circular or other cross section, or in the form of sheet-metal strips. Before the electric motor 3 is mounted on the hydraulic block 2, the electrical terminals 7 are embodied with their portion 10 located outside the plastic coating 9 extending in elongated form parallel to the longitudinal axis 8, as indicated by dot-dashed lines in the drawing.

When the electrohydraulic unit 1 is assembled, the electric motor 3 is mounted on the side face 5 of the hydraulic block 2 in the direction of the arrow 12 and secured to the hydraulic block. In this process, the electrical terminals pass through bores 13 of the hydraulic block 2 that connect the two side faces 5 and 6 to one another. While the plastic coating 9 of the respective terminal 7 extends inside the hydraulic block 2, which is made of a lightweight metal, the freely protruding portion 10 protrudes past the side face 5. The portion 10 is shaped in a subsequent work step, by tools not shown, into a resilient contact means 14 in the form of a barrette-like spiral spring. This spring extends with a first leg 15 along the side face 6 of the hydraulic block 2, spaced apart by a slight distance from it, then changes into a semicircular arc 16 and then continues in the form of a second leg 17 extending along the side face 6 at a greater spacing from it. Between the first leg 15 and the side face 6 of the hydraulic block 2, an insulating body 18 in the form of a slotted disk is inserted in a subsequent work step. The leg 15 engages the insulating body 18 with initial stress, and the insulating body may additionally be positionally secured by means not shown.

In a further assembly step, the control unit 4 is mounted in the direction of the arrow 20 on the side face 6 of the hydraulic block 2 and secured to it with screws 21. The control unit 4 includes electrical components of the electrohydraulic unit 1, of which only a stamped lattice 22 with an exposed contact face 23 is visible in the drawing. This contact face 23 is engaged by the associated contact means of the electric motor 3 with the free end 24 of its leg 17, with initial stress. The contact means 14 of the electric motor 3, which are elastically resilient in the mounting direction (arrow 20) of the control unit 4, require no plug in the control unit 4. They compensate for tolerances among the component groups, that is, the hydraulic block 2, electric motor 3 and control unit 4, of the electrohydraulic unit 1 both in the mounting direction and transversely to it.

In a departure from the exemplary embodiment, it is possible for the electrical terminals 7 of the electric motor 3 to be sheathed with the same sprayed-on plastic coating 9, for the hydraulic block 2 to be provided with a single, suitably shaped passage, and for the resilient contact means 14 of the two terminals to be insulated electrically from the hydraulic block 2 by a single insulating body 18.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electrohydraulic unit (1) for controlling pressure in brake systems of motor vehicles, comprising:

a hydraulic block (2), an electric motor (3), which is mounted on a first side (5) of the hydraulic block (2), said electric motor includes electrical terminals (7) which pass through the hydraulic block (2);

a control unit (4), which is mounted on a second side (6) of the hydraulic block (2) opposite the electric motor (3);

resilient contact means (14) embodied as U-shaped curved torsion springs for contacting the electrical terminals (7) of the electric motor (3) and which includes one free leg end (24) that engages a contact face (23) of the electrical components (22) of the control unit (4), and the resilient contact means (14) are resilient in a mounting direction (12) of the control unit (4).

2. An electrohydraulic unit in accordance with claim 1, in which the U-shaped curve torsion spring after emerging from the respective electrical terminal (7) of the electric motor (3) from the hydraulic block (2) is embodied with two legs (15, 17) joined by circular arc (16), of which the leg (15) extending along the hydraulic block (2) is electrically insulated from the hydraulic block 92).

3. An electrohydraulic unit in accordance with claim 2, in which an insulating body (18) is inserted between the hydraulic block (2) and the resilient contact means (14), said insulated block is engaged with a spring force by the leg (15) extending along the insulating body (18).

4. A method for assembling an electrohydraulic unit (1) having the following assembly steps:

mounting an electric motor (3) on a first side (5) of a hydraulic block (2), extending electrical terminals (7) of the electric motor (3) in an elongated state through a bore (13) in the hydraulic block (2) parallel to a motor axis (8), forming the electrical terminals (7) on a second side (6) of the hydraulic block (2) opposite the electric motor (3) as U-shaped curved torsion springs, mounting a control unit (4) on the second side (6) of the hydraulic block (2) opposite the electric motor (3) with the U-shaped curved torsion springs engaging contact faces (23) in the control unit (4) with a stress, spring force.

5. A method in accordance with claim 4, in which before mounting the control unit (4), an insulating body (18) is inserted between the hydraulic block (2) and a leg (15) of the U-shaped curved torsion springs that extends along the hydraulic block (2).

* * * * *